Sept. 20, 1932.    J. C. SAVAGE    1,878,331
OPTICAL PROJECTION APPARATUS
Filed May 23, 1929
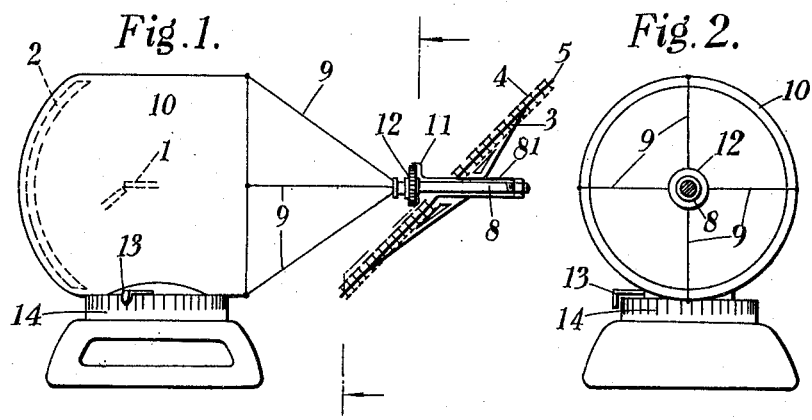
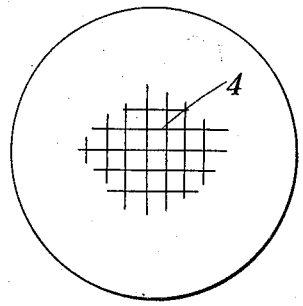
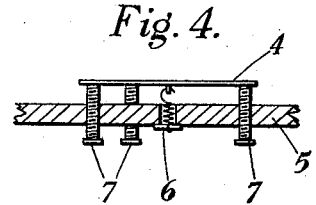
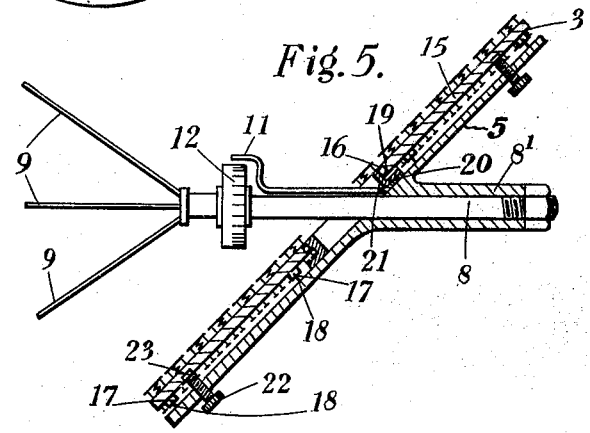
INVENTOR
J. C. Savage
BY
Langner, Parry, Card & Langner
ATTORNEYS Patented Sept. 20, 1932

1,878,331

UNITED STATES PATENT OFFICE

JOHN CLIFFORD SAVAGE, OF LONDON, ENGLAND

OPTICAL PROJECTION APPARATUS

Application filed May 23, 1929, Serial No. 365,505, and in France July 30, 1928.

The present invention relates to optical projection apparatus and especially to optical apparatus for projecting luminous areas, signs or the like upon remotely located screens such as naturally or artificially formed clouds for advertising and like purposes with high light efficiency.

More particularly the present invention relates to certain improvements in optical projection apparatus of the kind described in the specification of United States Patent No. 1,750,785 to the end that the luminous sign produced may be more easily and correctly observed by the largest possible number of observers.

In the specification of the aforesaid United States patent there is described and claimed a method and apparatus for projecting signs on to distant screens consisting in projecting an approximately parallel beam of light on to an assemblage of light transmitters said assemblage intersecting the beam of light at a relatively short distance from the projector and adjusting individual transmitters so that light spots are thrown on to the distant screen in predetermined disposition for constituting the sign and if desired the assemblage or mosaic of mirrors may be mounted so as to be revoluble about the axis of the beam in the manner of a swash plate so as to enable—in the case of projection on to clouds in the sky—the inclination of the sign with respect to the horizon to be changed.

With such apparatus notwithstanding that the sign is movable across the sky it is difficult for observers in certain positions to view it correctly owing to the fact that the sign as viewed by them will appear upside down. This may be remedied to some extent by mounting the whole apparatus upon a turntable as described in the specification of United States Patent No. 1,750,785 but the chief object of the present invention is to provide an apparatus of the character described enabling the sign to be correctly observed by the largest number of observers without it being necessary to rotate the whole apparatus.

Accordingly the present invention consists in an optical projection apparatus comprising a device for producing an approximately parallel beam of light, an assemblage of individually angularly adjustable optical units intersecting said beam at a relatively short distance from the projector thereof and means for enabling said assemblage to be rotated in its own plane.

The above and other features of the invention will now be described in detail with reference to the accompanying drawing illustrating a preferred embodiment of the invention and will be specifically pointed out in the claims appended hereto.

In the drawing:—

Figure 1 represents diagrammatically one simple form of apparatus to which the present invention may be applied.

Figure 2 represents a diagrammatic partial front elevational view of the apparatus shown in Figure 1.

Figure 3 represents a diagrammatic front elevational view of the reflecting unit shown in Figure 1.

Figure 4 diagrammaticaly illustrates one simple form of mounting for the reflecting units whereby they may be independently orientated.

Figure 5 illustrates one form of reflecting unit according to the present invention.

As shown in the drawing the apparatus comprises essentially a source of illumination 1 preferably of high intensity such as electric arc which may be located at or near the focus of a suitable reflecting element 2 such as a parabolic or other conveniently shaped mirror for projecting a substantially parallel beam of light horizontally on to a composite element or swash member indicated generally by the numeral 3 for collecting and directing the rays of light from the source of illumination 1 into the required direction or directions to produce the desired illuminated area on a screen interposed in their path. Conveniently the swash member 3 may comprise a plurality of reflecting units 4 of any desired shape or form—for example rectangular reflector units as illustrated in Figure 3— mounted upon a suitable backing element 5 and preferably each individually angularly adjustable. The swash member 3 is inclined at a convenient angle across the beam of light and has its axis disposed along the optical axis of the apparatus. The individual angular adjustment of the reflecting units may be obtained by mounting each unit 4 upon the backing element 5 by means for example of a ball and socket joint or by means of a spring 6, Figure 4, and providing means such as three adjustment screws or tappets 7 for rocking each unit to the desired extent. With such apparatus each unit 4 is adapted to deal with a corresponding pencil of light rays emanating from the source 1 and to produce by reflection in the case under consideration a luminous area upon a suitably located screen in a position which depends upon the amount to which the unit has been angularly adjusted or orientated. By suitable manipulation of the units 4 the several luminous areas produced may be caused to form for example a word or words or a composite luminous area of any other form upon the screen.

The apparatus illustrated in Figure 1 of the drawing is intended more especially for the projection of luminous signs words or the like skyward upon naturally or artificially formed clouds acting as a screen for example for advertising or like purposes although as will be understood it may be used for other purposes. As will be readily appreciated it is desirable that the position of the luminous area sign or the like in the sky should be capable of variation in order that it may be more easily observed by observers situated at various positions in relation to the place of projection. Accordingly the inclined swash member 3 is mounted so as to be rotatable about the optical axis of the apparatus. This may be effected by rotatably mounting the element 5 carrying the units 4 upon a shaft 8 held in a fixed position coincident with the optical axes of the apparatus by means of the stays 9 depending from the casing 10 enclosing the light source 1. For this purpose the backing element 5 of the swash member 3 may be provided with a tube-like extension 8' rotatable upon the shaft 8 such mounting permitting the easy replacement of the swash member 3 by another similar member. With the parts assembled as shown in Figure 1 by rocking the backing element 5 of the swash member 3 about shaft 8 the luminous sign or the like in the sky may be caused to assume different inclinations with respect to the horizon. If desired a pointer 11 attached to swash member 3 and adapted to move over a scale 12 upon the shaft 8 may be provided to enable the position of the member 5 to be correctly adjusted or read off at any time.

To enable the direction in which the sign is thrown to be varied the apparatus may be rotated about a vertical axis in any suitable manner, a scale 13 and pointer 14 being preferably provided to enable the requisite adjustment about this axis to be made or read.

In addition to the above means for varying the position of the sign in the sky it is sometimes convenient to be able to impart a movement of rotation to the luminous area sign or the like on the screen without varying the actual position of the said area sign or the like in order that the sign may be more readily observed by persons situated at different angular positions about the apparatus. This may conveniently be effected according to the present invention in the manner shown diagrammatically in Figure 5 by mounting the reflecting units or the like 4 upon a separate element 15 instead of on the element 5 as shown in Fig. 1 and by mounting the element 15 upon the element 5 in such manner that it is rotatable about an axis 16 perpendicular to the plane of the element 5. As shown in the drawing the element 15 is provided adjacent its inner and outer periphery with trunnions 17 carrying rollers 18 running on the element 5. The element 15 is also provided with a central circular aperture 19 seating upon a circular collar 20 upstanding from the element 5 through the agency of ball bearings 21. If desired means such as one or more screws and slots 22 and 23 provided on the elements 5 and 15 respectively may be provided whereby the elements 5 and 15 may be locked together or unlocked as required for example when it is desired to change the position of the sign in the sky by rocking the angularly inclined swash members about the shaft 8. If desired mechanical means such as gear teeth may be provided for rotating the element 15 upon the element 5 or it may be rotated by hand.

In apparatus constructed as described with reference to Fig. 5 the element 15 carrying the reflecting units 4 may be rotated relatively to the element 5 which is maintained stationary when it is desired to rotate the luminous sign on the screen. On the other hand by locking the element 15 to the element 5 and rotating the latter about the shaft 8 the position of the luminous sign on the screen may be varied without rotation thereof.

Conveniently and if desired the whole apparatus may be mounted upon a vehicle in order that it may be transported where desired.

Further means may be provided whereby the angular adjustment of the reflecting units 4 may be changed to produce a luminous area of any desired form without the trouble of manually adjusting each unit independently on each occasion when a change of sign is desired. In this case for example the units may be caused to assume a mean position in any convenient manner such as by springs and may each be provided with three adjustment tappets or rods projecting through suitable openings in the backing element 5 or in the element 15. For the purpose of changing the angular adjustment of the units 4 to produce a luminous area of different form there may be provided an element having a number of screw elements or the like corresponding to the tappets or rods provided upon each unit 4 and adapted to be set in predetermined positions so that when the element is brought against the backing element 5 or against the element 15 the screw elements contact with the tappets or rods provided upon the units 4 to rock simultaneously the appropriate units 4 in the desired manner. A similar result may be secured by moving suitable cam surfaces in contact with and past the tappets or rods provided upon the units 4.

Any suitable optical devices may be interposed in the path of the light rays at any place to produce color, distortion, or other similar results.

By the use of an apparatus as hereinbefore described it is possible to obtain a luminous area sign or the like which is not only substantially brighter than similar signs produced by systems involving the use of stencils or other facsimiles of the sign to be produced but which can be spread over a very much greater area and consequently is able to be read more easily at greater distances in any particular direction and at any desired inclination to the horizon. Furthermore this sign may be rotated on its axis as and for the purpose described.

While in the foregoing particular description the units 4 have been described as reflecting units they may include or be replaced by any other optical devices such as reflecting prisms capable of diverting a part or the whole of the incident beam.

Furthermore although the invention has been described herein particularly in relation to the projection of light it is to be understood that in so far as the method and apparatus described may be used without substantial modification in connection with other forms of radiations such as heat sound electromagnetic or like radiations such uses are to be understood as included within the scope of the invention and the claims are to be read as including such uses.

What I claim is:—

1. Optical projection apparatus comprising in combination a device for producing a substantially parallel beam of light, an element rotatable in its own plane mounted to occupy an inclined cross sectional area of said beam, and an assemblage of optical units mounted upon said element, each of said units having a predetermined angular adjustment in relation to the others.

2. Optical projection apparatus comprising in combination a device for producing a substantially parallel beam of light, an element rotatable in its own plane and occupying a cross sectional area of said beam, an assemblage of optical units mounted upon said element and mounting means for each of said units permitting individual angular adjustment thereof.

3. Optical projection apparatus comprising in combination a concave mirror, a powerful source of light located adjacent the focus of said concave mirror, an element mounted to occupy an inclined cross sectional area of the beam of light produced by said concave mirror and to be rotatable around the axis of said beam in the manner of a swash plate, an element rotatably mounted upon said first mentioned element, an assemblage of mirrors mounted upon said second mentioned element and means whereby each of said mirrors may be angularly adjusted.

4. Optical projection apparatus comprising a projector and a powerful source of light located adjacent its focus for producing a substantially parallel beam of light, an element mounted at an inclination across said beam of light for rotation around the axis of said beam in the manner of a swash plate, a further element mounted upon and for rotation in a plane parallel to the plane of said first mentioned element, an assemblage of mirrors mounted upon said second mentioned element, means to enable the angularity of each mirror to be adjusted and means for simultaneously adjusting the angularity of all said mirrors.

5. Optical projection apparatus comprising in combination a concave mirror having a powerful source of light located adjacent its focus for producing a substantially parallel beam of light, a uni-planar element positioned across said beam at an inclination to the axis thereof and mounted for rotation about said axis in the manner of a swash plate, a second element mounted upon and for rotation in a plane parallel to the plane of said first mentioned element, a plurality of mirrors mounted upon said second mentioned element and means for releasably locking said second mentioned element to said first mentioned element.

6. Optical projection apparatus comprising in combination a concave mirror having a powerful source of light located adjacent its focus for producing a substantially parallel beam of light, a shaft coincident with the axis of said beam, a uni-planar element positioned across said beam at an inclination to the axis thereof and mounted upon said shaft for rotation about said axis in the manner of a swash plate, a second element mounted upon and for rotation in a plane parallel to the plane of said first mentioned element, a plurality of mirrors mounted upon said second mentioned element, mounting means for each of said mirrors whereby they are individually angularly adjustable and means for releasably locking said second element to said first element.

In testimony whereof I have signed my name to this specification.

JOHN CLIFFORD SAVAGE.